United States Patent Office 3,733,190
Patented May 15, 1973

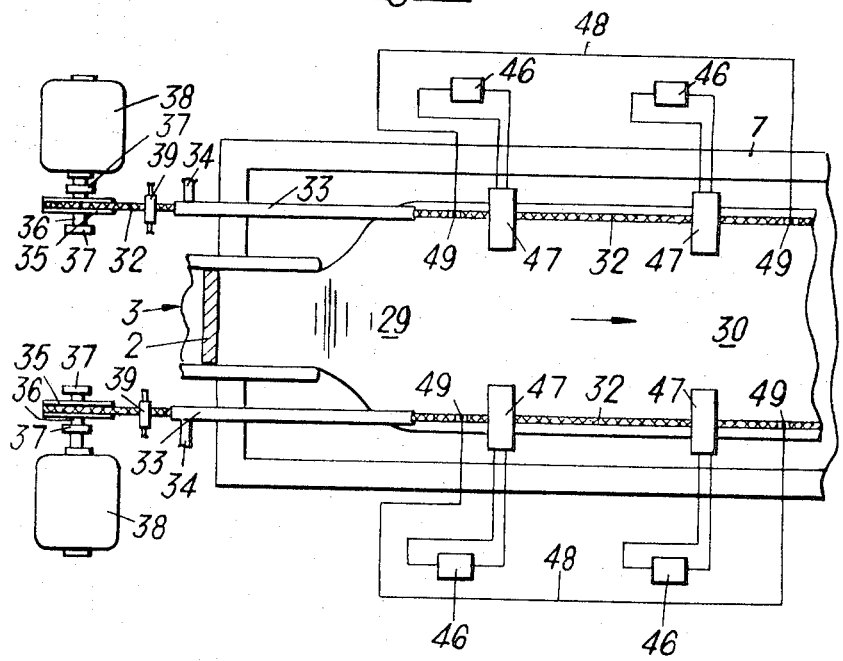

3,733,190
MANUFACTURE OF FLOAT GLASS BY APPLYING LATERAL ELECTROMAGNETIC FORCES TO THE EDGES
Jack Lawrenson, St. Helens, and Frederick William Silverwood, Appleby Bridge, England, assignors to Pilkington Brothers Limited, Liverpool, Lancashire, England
Filed Feb. 2, 1971, Ser. No. 111,905
Claims priority, application Great Britain, Mar. 9, 1970, 11,235/70
Int. Cl. C03b 18/02
U.S. Cl. 65—91
20 Claims

ABSTRACT OF THE DISCLOSURE

The thickness of a float glass ribbon is regulated by electromagnetically applying transversely-directed forces to molten glass in ribbon form as it is advancing along a molten metal bath. The margins of the glass are provided with electrically conductive regions along which current flow takes place, and each region is subjected to a magnetic field acting through the glass to produce said transversely-directed forces.

BACKGROUND OF THE INVENTION

(1) Field of the invention

This invention relates to the float process for the manufacture of flat glass in which a layer of molten glass is established on a bath of molten metal, and a buoyant body of molten glass developed from that layer is advanced in ribbon form along the bath and is cooled as it is advanced until it is sufficiently stiffened to be taken unharmed from the bath.

(2) Description of the prior art

A desired width and thickness of the ribbon of glass can be produced by control of longitudinally directed tractive effort applied to the ribbon in conjunction with control of the viscosity of the advancing ribbon. Transverse forces may be applied to the ribbon, for example to maintain the width of the ribbon as it is attenuated. Such forces have been applied to the ribbon by mechanical contact with the ribbon, for example by means of edge rollers engaging the margins of the ribbon. Mechanical contact with the ribbon is detrimental to the quality of the margins of the ribbon, and does not apply uniform force along the ribbon margins.

It is a main object of the present invention to provide an improved method and apparatus for manufacturing float glass in which transversely directed forces are uniformly and accurately applied to the glass in a precisely controlled manner by non-mechanical means.

SUMMARY

The invention teaches a method of manufacturing float glass in which a body of molten glass is established on a bath of molten metal and is advanced along the bath. The glass is subjected to a force in the plane of the glass by establishing along a region of the glass an electric current flow at right angles to the intended direction of influence of the force, subjecting the glass in that region to the influence of a magnetic field acting through the glass, and regulating the magnetic field and the current flow to produce the force acting on the glass.

More particularly for developing transversely-directed forces for ribbon thickness regulation, the margins of the ribbon are provided with electrically conductive regions. An electric current is passed along those regions, and each region is subjected to a magnetic field directed perpendicularly to the plane of the ribbon. Transversely-directed forces so produced in the glass affect transverse flow of the glass on the bath surface as the ribbon is developed.

The transverse forces to which the glass ribbon is subjected are, by the method of the invention, uniformly distributed along the length of the margins of the ribbon and the width and thickness of the ribbon is thus regulated without any mechanical contact with the ribbon. The forces may act outwardly to thin the ribbon or inwardly to thicken the ribbon.

BRIEF DESCRIPTION OF THE DRAWINGS

FIG. 4 is a diagrammatic plan view, similar to FIG. 2, of apparatus incorporating another embodiment of the invention.

DESCRIPTION OF THE PREFERRED EMBODIMENTS

Figure 1:
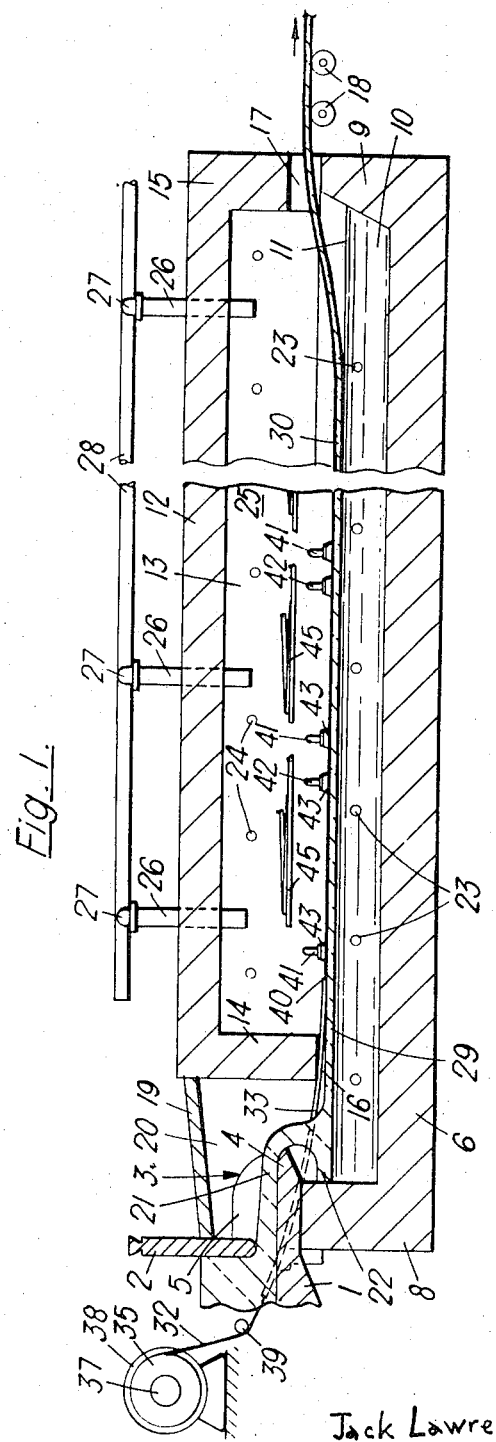
FIG. 1 is a diagrammatic longitudinal sectional view of apparatus according to the invention for use in manufacturing flat glass.

Referring to FIG. 1 of the drawings, a forehearth of a continuous glass melting furnace is indicated at 1 and a regulating tweel at 2. The forehearth 1 ends in a spout 3 comprising a lip 4 and side jambs 5, one of which is shown in FIG. 1. The lip 4 and side jambs 5 together constitute a spout of generally rectangular cross-section.

The spout 3 is disposed above the floor 6 of an elongated tank structure including side walls 7 joined together to form an integral structure with the floor 6, an end wall 8 at the inlet end of the tank, and an end wall 9 at the outlet end of the tank. The tank structure holds a bath of molten metal 10 whose surface level is indicated at 11. The bath is, for example, a bath of molten tin or of an alloy of tin in which tin predominates and the bath has a specific gravity greater than that of the glass.

A roof structure is supported over the tank structure and includes a roof 12, side walls 13 and integral inlet and outlet end walls 14 and 15. The inlet end wall 14 extends downwardly close to the surface 11 of the molten metal 10 to define with that surface an inlet 16 which is restricted in height and through which molten glass is advanced in ribbon form as will be described below. The outlet end wall 15 of the roof structure defines with the outlet end wall 9 of the tank structure an outlet 7 through which the ultimate ribbon of glass produced on the bath is discharged on to driven conveyor rollers 18 mounted outside the outlet end of the tank and disposed somewhat above the level of the top of the end walls 9 of the tank structure so that the ribbon is lifted clear of the wall 9 for discharge through the outlet 17.

The rollers 18 convey the ribbon of glass to an annealing lehr in well known manner and also apply tractive effort to the ribbon of glass to assist in advancing the ribbon as it glides along the surface of the bath 10.

A forward extension 19 of the roof 12 extends up to the tweel 2 and forms a chamber with side walls 20 in which chamber the spout 3 is disposed.

Molten glass 21 is poured on to the bath 10 of molten metal from the spout 3 and the tweel 2 regulates the rate of flow of the molten glass 21 over the spout lip 4. The spout is vertically spaced from the surface 11 of the bath so that the molten glass 21 has a free fall of a few inches, exaggerated in FIG. 1, to the bath surface. This free fall is such as to ensure the formation of a heel 22 of molten glass behind the glass 21 pouring over the spout, which heel 22 extends up to the inlet end wall 8 of the tank structure.

The temperature of the glass is regulated as it is advanced along the bath from the inlet end down to the discharge end by thermal regulators 23 immersed in the bath 10, and thermal regulators 24 mounted in the head-space 25 which is defined over the bath by the roof structure. A protective gas is supplied to the headspace through ducts 26 which are provided at intervals in the roof 12 and which are connected by branches 27 to a header 28 which is connected to a supply of protective gas. A plenum of protective gas is thus maintained in the headspace 25, which is a substantially closed headspace, and there is outward flow of protective gas through the inlet 16 and the outlet 17.

The temperature of the molten glass is regulated by the thermal regulators 23 and 24 as the glass is advanced along the bath so as to ensure that a layer of molten glass 29 is established on the bath. The temperature of the molten glass in the layer of molten glass 29 formed on the bath is regulated in the range of about 850° C. to 1000° C. and often preferably in the range of about 850° C. to 950° C. in this region. This layer 29 is advanced along the bath through the inlet 16 and as it is advanced lateral flow of the molten glass occurs under the influence of surface tension and gravity until there is developed from the layer 29 a buoyant body of molten glass which is advanced in ribbon form 30 along the bath. The width of the tank structure at the surface level 11 of the bath is greater than the width of the molten glass ribbon 30 so that there is no limitation to the initial lateral flow of the molten glass.

The molten glass ribbon is cooled progressively as it is advanced along the bath so that it reaches the discharge end of the bath as a ribbon 30 at a temperature of 650° C. for example, which is sufficiently stiff to be removed from the bath by the rollers 18 without damage.

Figure 2:
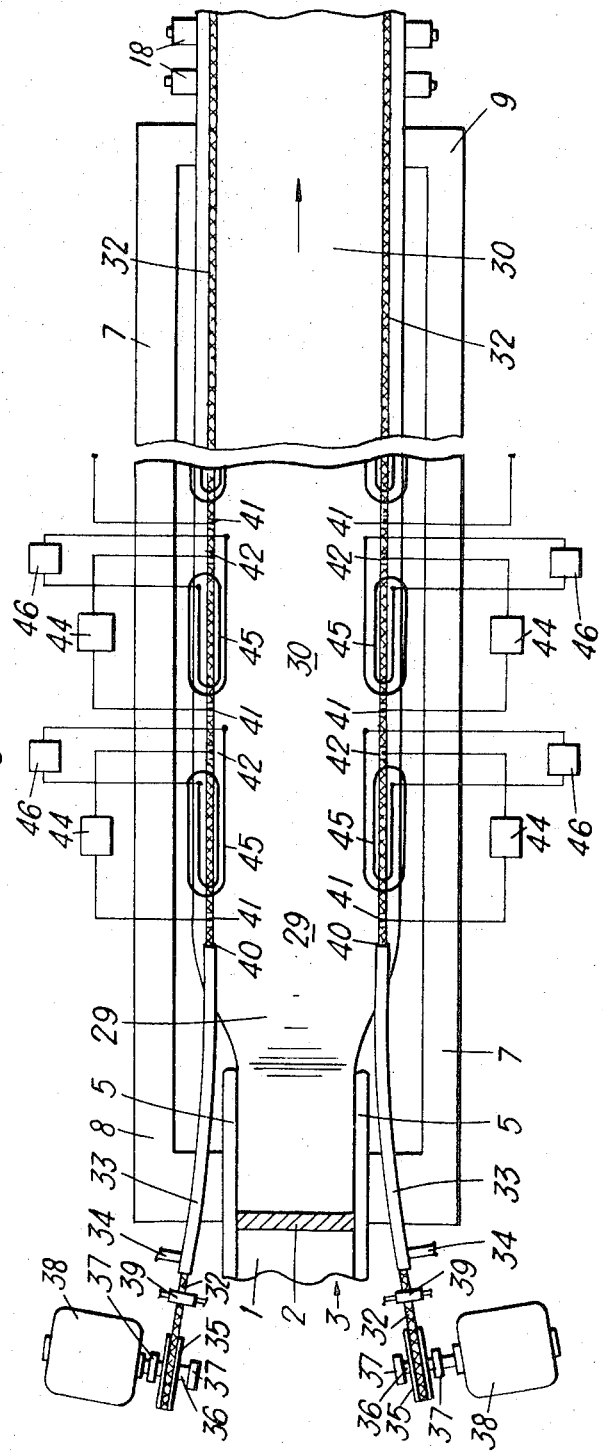
FIG. 2 is a diagrammatic plan view of part of the apparatus of FIG. 1 with the tank roof structure removed.

The lateral flow of the molten glass layer 29 to form the ribbon 30 is illustrated in FIG. 2 and, according to the invention the thickness of the resulting glass ribbon is regulated by regulating the extent of the lateral flow of the glass layer 29.

In particular a thin glass ribbon is produced by applying controlled outwardly-directed horizontal forces, transverse to the direction of advance of the ribbon, to the margin of the glass as the buoyant body formed from the layer 29 is just assuming advancing ribbon form. These forces are generated by the interaction of electric currents flowing longitudinally along the margins of the glass and magnetic fields directed through the glass so that components of the resulting interaction force act in the desired outward direction to thin the body of glass 29 to a desired thickness in the time during which the glass is subjected to the outwardly directed forces.

Preferably the magnetic field is directed perpendicularly to the electric current, that is perpendicularly to the glass surface so that the resulting transverse forces act outwardly in the plane of the glass ot supplement gravitational forces acting to spread the glass and thereby stretch the glass by a required amount to produce a ribbon of glass of a thickness in the range of 1.5 mm. to 3.5 mm., with specific desirable thicknesses often being glass of 2 mm. thicknesses or of 1.5 mm. thickness.

In order to render the margins of the glass electrically conductive two marginal electrically conductive stripes 32 are applied to the upper surface of the glass along the opposite edges thereof. Each stripe 32 is constituted by woven metal braid, e.g. of tinned copper wire, which is laid down on to the supper surface of both margins of the body 29 of molten glass and becomes embedded in the glass surface.

At each side of the spout 3, feeding means is provided for feeding the metal braid 32 on to the glass surface, and each braid feeding means comprises a steel guide tube 33 of flattened rectangular cross-section which leads over the inlet end wall 8 of the tank structure and is curved inwardly and downwardly as shown in FIGS. 1 and 2, to lead the braid 32 smoothly and gently on to the glass surface.

A gas supply tube 34 is connected to the guide tube 33 and is connected to a source of the same protective gas as is fed into the headspace over the bath, so as to prevent contaminating gases from entering the headspace through the tube 33.

The braid 32 is supplied from a reel 35 which is mounted on a shaft 36 which rotates in bearings 37 and is driven by an electric motor 38. The braid 32 is drawn from the reel 35 by a pair of driven rollers 39, one of which is shown, which are driven in synchronism with the drive to the shaft 36 to predetermine the rate at which the braid is fed down the guide tube 33. The forward velocity given to the braid is such that it leaves the inner mouth 40 of the tube at exactly the speed at which the glass 29 is advancing forwardly beneath the tube mounth 40.

As shown in FIG. 2, identical braid feeding arrangements are shown on both sides of the spout so that both margins of the body 29 of molten glass are simultaneously provided with continuous electrically conductive stripes.

To establish electrical connection with the conductive braid 32 pairs of longitudinally spaced-apart locating electrodes 41 and 42 are positioned at intervals along the bath above the margins of the glass carrying their stripes of braid 32. A molten metal body 43 clings to each electrode 41, 42 and makes electrical connection with the marginal braid 32 below that electrode. Each pair of electrodes 41 and 42 is connected to an electric current supply 44 which can be regulated to control the current passing along the part of the braid between the electrodes 41 and 42. A coil 45 of elongated shape, and made up of two complete turns, overlies the braid, between the electrodes 41 and 42, and the ends of each coil 45 are connected to a controllable electric current supply 46 individual to that coil.

Each of the coils 45 is positioned so that the magnetic field produced by current flow therein is directed vertically through the underlying margin of the glass. At the same time current is flowing through the braid beneath the coil, and the resulting interaction force on the margin of the glass acts outwardly tending to thin the molten body 29 as the ribbon 30 is formed. The force applied is varied by individually adjusting the current flow in the braid and in each coil. The direct current supplied to the braid 32 by the supply 44 may be 20 to 30 amperes at a supply voltage of 10 to 20 volts. The magnetic field is produced by a higher current in the coil, e.g. 200 to 350 amperes, supplied by the suuply 46 at 50 volts.

Alternating current may be supplied to the conductive stripes along the margins of the ribbon and in this way of working; the magnetic field operating on each margin is alternated in synchronism with the current so that the induced forces acting transversely on the glass are maintained in the same direction. Conveniently the magnetic field associated with each conductive margin is produced by current flow in a coil conductor which is used to provide the correct current flow in the conductive stripe along the margin of the glass.

In the embodiment illustrated in FIGS. 1 and 2 the outwardly directed forces are acting on the advancing molten glass after it has assumed ribbon form, but the influence of the transverse forces is felt nearer to the spout while the body of molten glass is spreading, so that the glass has practically achieved a desired thickness by the time the braid 32 is being laid on to its margins and the transverse force is being applied. Thereafter the advancing ribbon continues to be subjected to transverse forces along its length as its margins pass beneath the succession of coils 45. The width of the ribbon is thus held as the ribbon cools so that its edges cannot move inwardly to cause the ribbon to assume a lesser width and a greater thickness. The electromagnetic arrangement according to the invention for applying transverse force to the molten glass is a positively stable system which is self-regulating to maintain the margins of the ribbon moving along paths determined by the disposition of the coils 45. Particularly when the coils define parallel paths for the ribbon margins, any tendency for the ribbon to stray by a sideways trend to "snake" on the bath is self-corrected by the electromagnetic forces which restore each margin to its intended path.

In this way, not only can the molten glass body be caused to spread to a width such that the thickness of the formed ribbon of glass is as low as 2 mm. or even 1.5 mm., but also that width and thickness are accurately maintained as the ribbon is cooled to a temperature at which it is sufficiently stiffened to hold its form, due to the continuous marginal forces exerted transversely of the ribbon.

As the ribbon cools, less transverse force is necessary to prevent loss of width, and the individual regulation of the current supplied to each coil and to each length of the braid permits adjustment as appropriate.

Some attenuation of the glass may be effected by regulation of the tractive force applied to the glass and the viscosity regime to which the glass is subjected, and the loosely woven nature of the braid 32 enables some stretching of the advancing glass to take place, for example to trim the thickness dimension of the glass.

Figure 3:
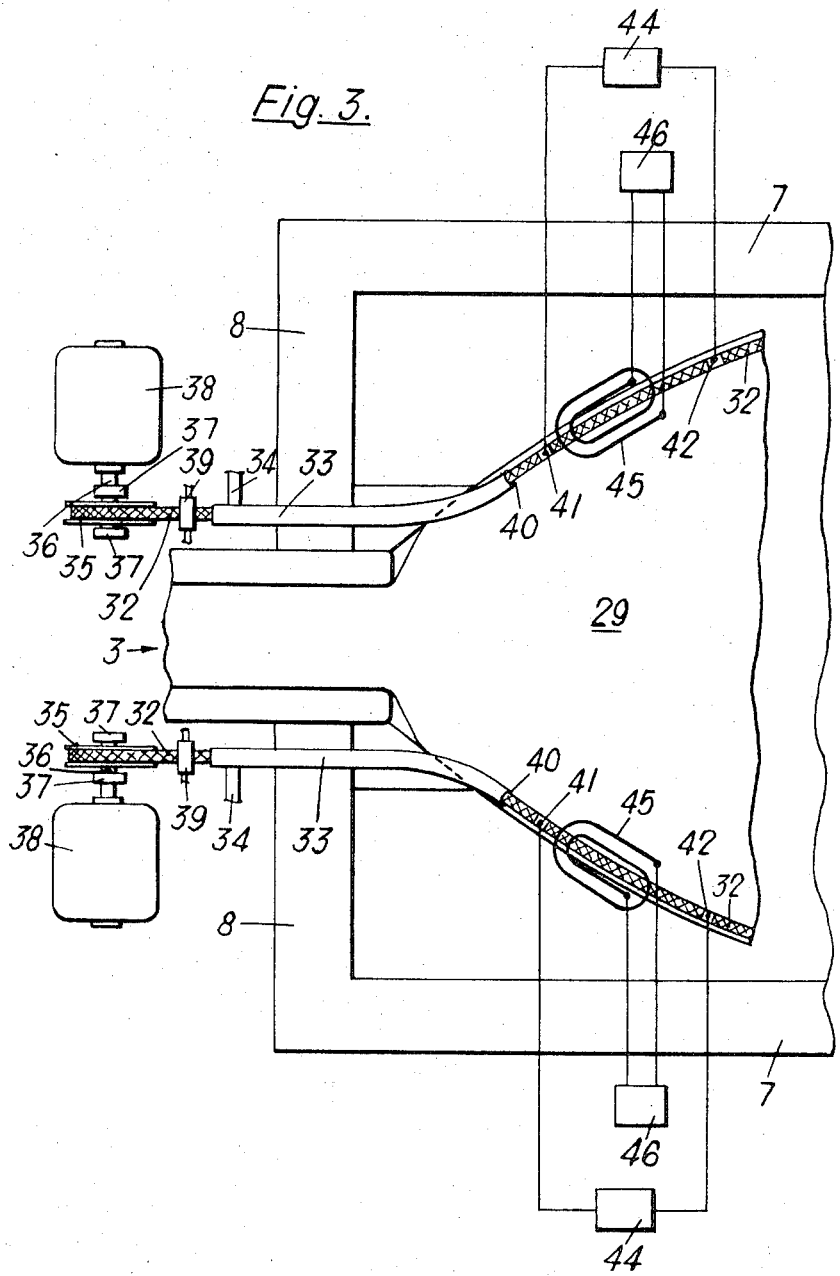
FIG. 3 is a plan view illustrating the operation of the invention on spreading glass at the inlet end of the apparatus.

The application of transverse stretching forces may begin as the body of molten glass is spreading on the bath. For example as shown in FIG. 3, the guide tubes 33 are positioned close to the spout so as to deposit the woven metal braid 32 on the margins of the molten glass 29 as it is spreading. The first coils 45 and contacting electrodes 41 and 42 are positioned above the margins of the spreading glass 29 so that the lateral flow of the molten glass layer 29 is directly augmented by the transverse forces induced at the margins of the spreading layer of molten glass.

Another embodiment of the invention is illustrated in FIG. 4, in which the linear induction motor principle is used to provide the transverse forces on a glass ribbon 30 by electromagnetic interaction. Electrically conductive braid 32 is laid on to the margins of the glass ribbon 30 as induction motors 47 are arranged at intervals along the bath above the opposite edge regions of the ribbon 30, the motors 47 being spaced a short distance above the respective stripes 32. Opposite ends of the respective stripes 32, are interconnected externally by leads 48, contact with the stripes 32 being effected through "wetted" electrodes 49 similar to the electrodes 41, 42 of the previously described embodiment.

The linear induction motors 47 operate in a well-known way to induce currents in the respective stripes 32, these induced currents interacting with magnetic fields perpendicular to the plane of the ribbon 30 produced beneath the motors 47 to apply transverse forces to the stripes 32, and therefore, to the margins of the ribbon 30.

Instead of the wetted electrodes 41, 42 or 49 making electrical contact with the stripes 32, free-running graphite rollers may be employed. The conductive stripes 32 may be applied in other ways, for example in the form of carbon or metal coatings applied as a spray.

Also alternative means for applying magnetic fields in the region of the conductive stripes 32 may, for example comprise pairs of parallel conductors extending respective stripes 32.

We claim:

1. A method of manufacturing flat glass in which a body of molten glass is established on a bath of molten metal and is advanced in ribbon form along the bath, comprising subjecting the glass to transverse forces uniformly applied along the margins of the ribbon in the plane of the glass, by establishing an electric current flow along the margins of the ribbon, subjecting the margins of the ribbon to the influence of a magnetic field acting through the glass, and regulating the magnetic field and the current flow to generate in the glass transverse forces acting on the ribbon of glass.

2. A method of manufacturing float glass in which glass is delivered at a controlled rate to a bath of molten metal to establish a layer of molten glass on the bath, lateral flow of the glass in said layer is permitted to develop a ribbon of glass which is advanced along the bath, the margins of the ribbon containing electrically conductive regions extending along the ribbon margins, electric current is passed through said electrically conductive regions, and each region is subjected to a magnetic field directed through the ribbon margins perpendicularly to the plane of the ribbon to cause transversely-directed forces in the glass to affect transverse flow of the glass on the bath surface as the ribbon is developed.

3. A method according to claim 2, in which said electrically conductive regions are formed by woven metal braid which is fed on to the upper surface of each margin of the ribbon and becomes embedded in the glass surface.

4. A method according to claim 2, in which direct current is supplied to said regions, and the direction of the magnetic field to which each region is subjected is related to the direction of the current in each region so that transversely directed forces act on the margins of the glass to regulate the thickness of the ribbon as it is formed.

5. A method according to claim 4, including regulating the magnetic field to maintain constant opposed forces acting outwardly on the ribbon, whereby the ribbon of glass is developed with a predetermined width and thickness.

6. A method according to claim 4, in which the temperature of the molten glass in the layer of molten glass formed on the bath is regulated in the range 850° C. to 950° C., and the magnetic field is regulated in relation to longitudinally directed tractive effort applied to the ribbon to develop from said layer a ribbon of glass of thickness in the range 1.5 mm. to 3.5 mm.

7. A method of manufacturing float glass in which molten glass is poured at a controlled rate on to a bath of molten metal to establish the body of molten glass on the bath by outward spreading of the glass arriving on the bath to develop a ribbon of float glass, electrically conductive material is deposited along the margins of the outwardly spreading body of molten glass, current flow is established through the conductive regions so produced, and a magnetic field is directed through the margins of the spreading glass, whereby forces acting in the plane of the glass areoperable to influence the spreading of the glass in said body.

8. A method according to claim 7, in which said electrically material is woven metal braid which is fed on to the upper surface of each margin of the spreading body of molten glass and becomes embedded in the glass surface.

9. A method according to claim 7, in which direct current is supplied to said conductive regions, and the direction of the magnetic field to which each region is subjected is related to the direction of the current in each region so that transversely-directed forces act on the margins of the spreading glass to regulate the thickness of the ribbon of glass as it is formed.

10. Float glass manufacturing apparatus comprising an elongated tank structure containing a molten metal bath, means for delivering glass to the bath at a controlled rate and advancing the glass along the bath as buoyant body of molten glass in ribbon form which is cooled as it is advanced until it is sufficiently stiffened to be taken from the bath, means for establishing electrically conductive regions extending along the margins of the ribbon of glass, electrodes mounted in the tank structure so as to contact said electrically conductive marginal regions, an electric current supply means connected to the electrodes, and magnetic means mounted above the path of travel of said region of the glass so as to direct a magnetic field through that region of the glass, whereby forces acting on the glass in the plane of the glass are generated in said region.

11. Apparatus according to claim 10, further including temperature regulators at the inlet end of the bath to regulate the temperature of the molten glass arriving on the bath so that lateral flow of the molten glass takes place to establish said buoyant body on the bath, and wherein said electrodes comprise locating members mounted above the bath in the region where said lateral flow takes place to locate against the upper surface of the margins of the ribbon of glass molten metal bodies clinging to the locating members, through which bodies electrical connection is established to the conductive region.

12. Apparatus according to claim 10, wherein the magnetic means comprise at least one coil mounted above the path of travel of the said electrically conductive region of the glass.

13. Apparatus according to claim 12, including coils of elongated form mounted in line above the margins of the glass, each coil being individually connected to said electric current supply means and being associated with two locating members with clinging molten metal bodies located over the path of travel of the margin of the glass adjacent either end of the coil and making electrical connection with the marginal stripe underlying that coil, and a separate electric current supply connected to those locating members.

14. Apparatus according to claim 10, wherein the ends of each conductive region are short-circuited, and a linear induction motor is mounted above each region, which motor is directed transversely of the tank structure, each motor being operable to induce electric current flow in the associated conductive region and a magnetic field perpendicular to the plane of the ribbon and thereby engender transversely-directed stretching forces acting to thin the glass.

15. Apparatus according to claim 10, wherein said means for establishing electrically conductive regions includes at either side of the glass delivering means, feeding means for feeding woven metal braid on to the surface of both margins of the glass.

16. Apparatus according to claim 15, wherein each braid feeding means comprises a guide tube whose outlet is positioned close to the bath surface and is oriented to lay down metal braid on to the glass, and means for feeding braid down the guide tube at a rate commensurate with the rate of advance of the glass along the bath.

17. In a method of manufacturing flat glass in which a body of molten glass is established on a bath of molten metal and is advanced in ribbon form along the bath, and in which the thickness of the ribbon is regulated by the application of force to the ribbon in a direction generally transverse to the direction of ribbon advance, the improvement comprising: magnetically applying said force to the ribbon generally transverse to the direction of ribbon advance.

18. The improvement according to claim 17 wherein the step of magnetically applying said force comprises applying said force through electromagnetic induction.

19. In a flat glass manufacturing apparatus including a tank structure containing a molten metal bath, means for delivering glass to the bath, means for advancing the glass along the bath as a buoyant body of molten glass in ribbon form which is cooled as it is advanced until it is sufficiently stiffened to be taken from the bath and means for regulating the thickness of the ribbon by the application of force to the ribbon in a direction generally transverse to the direction of ribbon advance, the improvement comprising: means for magnetically applying said force to the ribbon generally transverse to the direction of ribbon advance.

20. The improvement according to claim 19 wherein said means for magnetically applying said force comprises electromagnetic induction means.

References Cited
UNITED STATES PATENTS 3,496,736    2/1970    Hurwitz et al.    65—99 A
3,479,171    11/1969    Robinson et al.    65—99 A ROBERT L. LINDSAY, Jr., Primary Examiner U.S. Cl. X.R.
65—99 A, 182 R, 199